J. M. REID.
Molds for Casting Water Traps.
No. 167,021.  Patented Aug. 24, 1875.
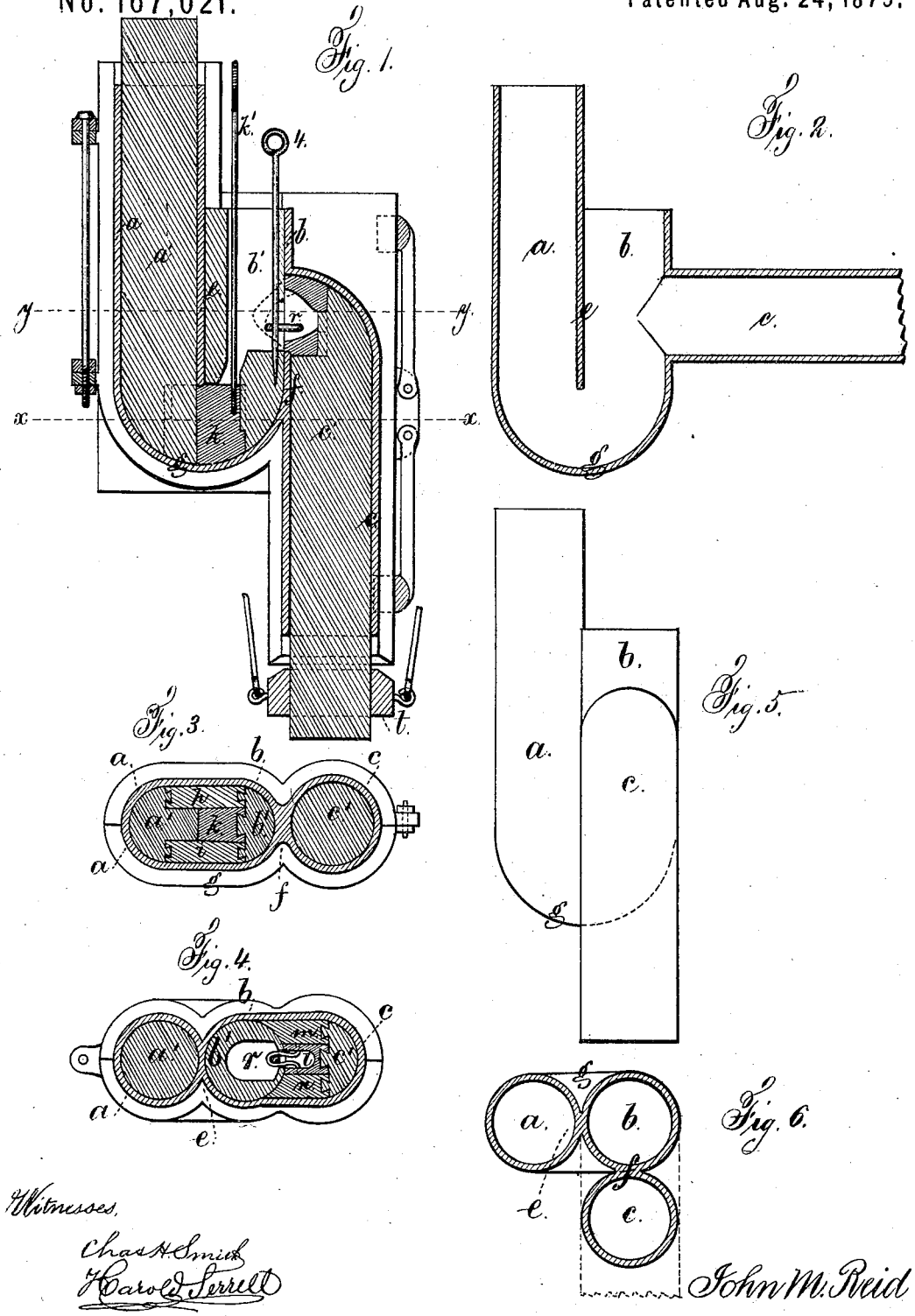

UNITED STATES PATENT OFFICE.

JOHN M. REID, OF MONTREAL, CANADA.

IMPROVEMENT IN MOLDS FOR CASTING WATER-TRAPS.

Specification forming part of Letters Patent No. 167,021, dated August 24, 1875; application filed February 9, 1875.

*To all whom it may concern:*

Be it known that I, JOHN M. REID, of the city of Montreal, in the Dominion of Canada, have invented an Improvement in the Manufacture of Tubular Water or Stench Traps, of which the following is a specification:

This invention relates to a peculiarly-constructed core for cast-metal traps, which core is very simple and easily removed from the trap.

In the drawing, Figure 1 is a vertical section of the trap and its mold and cores, with the delivery-pipe vertical and parallel to the inlet-pipe. Fig. 2 is a similar view, with the delivery-pipe passing off nearly horizontally. Fig. 3 is a sectional plan at the line $x\ x$, and Fig. 4 is a sectional plan at the line $y\ y$, of Fig. 1. Fig. 5 is an elevation, and Fig. 6 a sectional plan, of a trap with the delivery-pipe in a plane that stands at an angle to the plane of the inlet and intermediate pipes.

The inlet-pipe $a$, intermediate pipe $b$, and delivery-pipe $c$ are parallel to each other in the S-trap shown in Figs. 1, 3, 4, 5, and 6; but in the P-trap shown in Fig. 2 the delivery-pipe is nearly horizontal.

Tubular water or stench traps heretofore made have been in the form of a bent tube, with a space between one bend and the next. I have made my trap with the round tubes $a$ and $b$, being in one so as to only have one common wall or partition, $e$, and the same is true of the tubes $b$ and $c$ when they are parallel, as in Figs. 1, 3, 4, 5, and 6, there being a partition, $f$, that is common to both, and I remark that the rounding portions of the tubes merge into these partitions, as shown in Figs. 3, 4, and 6.

The bend $g$, that unites $a$ and $b$, is circular at any radial plane passing through the center from which the curve is described. The end of the tube $b$ is straight and open for convenience in extracting the core, and to give access to the trap for cleaning, and upon the open end of the said tube $b$ a screw or other cap is provided. The junction of the tube $c$ with the tube $b$ is a quarter-circle bend, as seen in Fig. 1.

This construction of trap is much more convenient to cast with a metal core than the traps heretofore made with long bends; and in consequence of the peculiarity of the trap I am enabled to employ the cores next described, which are very cheap and simple. The cores $a'\ b'\ c'$ are slightly tapering, so that they can be each of one piece, and they can be pulled endwise out of the open ends of the respective tubular portions $a\ b\ c$ of the trap.

It will be evident that the inner ends of the respective cores $a'\ b'\ c'$ can only fit the curved inside of the pipe to a plane passing through the center of the core, and at right angles to the plane of the curve. I therefore remove the side portions of the cores $a'\ b'\ c'$ at their ends and insert the side pieces $h\ i$ and a central block, $k$, and these pieces are held together by dovetailed blocks entering dovetailed grooves, (see Fig. 3,) so that the core $b'$ can be removed, and then the central block $k$ can be taken out by a rod, $k'$, that is provided therein, and which passes through the core $b'$, the latter being made hollow for convenience. The core $a'$ is then removed, and the side pieces $h\ i$ are thus left loose and can be shaken out.

If this construction of core is used with a trap in which the pipes $a$ and $b$ have a space between them, then the block $k$ and side pieces $h\ i$ must be larger, to fit the curved interior of the bend, and these blocks $k$ and side pieces $h\ i$ may, for convenience in withdrawing, be divided in a plane passing transversely to the plane of the trap; and the core at the quarter-circle bend, between the pipes $b\ c$, will also be similarly constructed.

When the core $c'$ of the pipe $c$ is straight, as shown in Fig. 1, then it may be made of one piece, with a swinging loop, $r$, that passes through a mortise in $b'$, and receives a key or wedge, 4, so as to hold the parts together, and this key is removed before withdrawing the core $b'$, and this loop $r$ swings out of the way when the core is being withdrawn. In that case the order in which the cores are preferably withdrawn is as follows: first the core $b'$; then $c'$, $k$, $a'$, $h$, and $i$.

When the tube $c$ is parallel to the tubes $a$ and $b$ the core at the junction of $b$ and $c$ is made of three pieces, $l\ m\ n$, and the loop $r$ is placed in the middle piece $l$, and dowels or dovetailed blocks are used, as aforesaid, to connect the respective parts, but allow the core $c'$ to be withdrawn, then the block $l$ to be removed from between $m$ and $n$, so that they may become loose and fall out. This is preferably done before removing the block $k$ and side pieces $h$ and $i$.

In the casting of lead traps there is always difficulty resulting from imperfections, air-holes, and flaws. I avoid this by immersing the mold and its cores in the melted metal and allowing the metal to rise gradually into the mold from the bottom. It is, however, necessary to make some provision for closing the lower orifice before removing the mold. I accomplish this by a ring-valve, $t$, that surrounds the core $c'$, and is operated by rods extending upward, so that it can be closed against the lower end of the tube $c$ before the mold is removed.

These traps may be made of lead, composition, or any other metal or material.

I claim as my invention—

1. The cores $a'$ and $b'$, each made of one piece of metal and slightly tapering, in combination with the blocks $h$ $i$ $k$, introduced at the bend of the pipe, as and for the purposes set forth.

2. The swinging loop $r$ and key or wedge, in combination with the cores $b'$ $c'$, as and for the purposes set forth.

Signed by me this 5th day of February, A. D. 1875.

JOHN M. REID.

Witnesses:
GEO. T. PINCKNEY,
CHAS. H. SMITH.